May 18, 1943. H. C. BARBOUR ET AL 2,319,528
APPARATUS FOR DRILLING HOLES IN STONE
Filed July 23, 1942

INVENTOR.
HOWARD C. BARBOUR
BY FRANKLIN S. MILLER
Kwis Hudson & Kent
ATTORNEYS

Patented May 18, 1943

2,319,528

UNITED STATES PATENT OFFICE 2,319,528

APPARATUS FOR DRILLING HOLES IN STONE

Howard C. Barbour, Elyria, and Franklin S. Miller, Amherst, Ohio, assignors to The Cleveland Quarries Company, Cleveland, Ohio, a corporation of Ohio Application July 23, 1942, Serial No. 452,100

2 Claims. (Cl. 125—20)

This invention relates to apparatus for drilling holes in grindstones or quarried stone, and has for its principal object to provide a drill which is highly efficient in action and which can be inexpensively made and readily mounted on the drill spindle.

The invention comprises a drill in the form of a tube or pipe provided with spirally arranged openings which are so located that one of them will always be in cutting position at the lower end of the drill, together with means for breaking up the core so that it is prevented from working itself up through the drill.

A drill having spirally arranged openings is quite old as such a drill has been used in making drill holes in unquarried rock, and we claim no novelty in this feature per se. However, the important part of our invention resides in the means which we have provided for breaking up the core which consists in the provision on the inside of the hollow drill of lengthwise extending protuberances or ribs which are produced by impressing the same in the tube, as by crimping the tube inwardly at one or more points, or by welding one or more rods to the inner wall of the drill tube.

The invention may be further briefly summarized as consisting in certain novel details of construction and combinations and arrangements of parts which will be described in the specification and set forth in the appended claims.

In the accompanying sheet of drawings wherein we have shown several embodiments of the invention, Fig. 1 is a perspective view illustrating conventionally drilling equipment including a drill formed in accordance with our invention;

Figure 1:
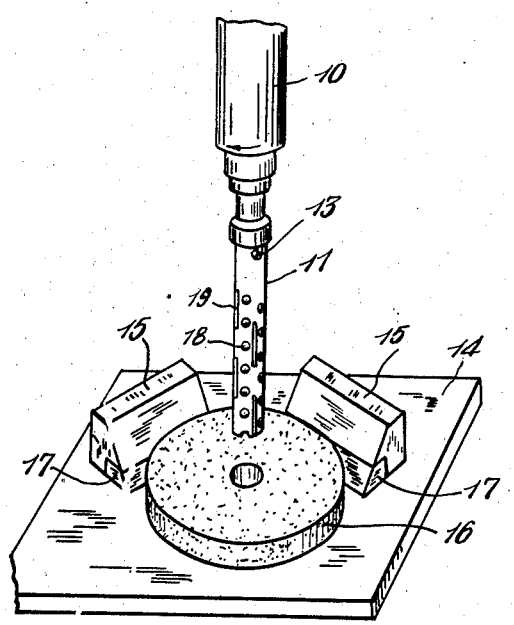

Fig. 1 illustrates conventionally or in simplified form a drilling machine with which our invention may be employed. This drilling machine includes a drill spindle 10 to which is attached in any suitable manner our improved drill 11. In this instance, the drill is provided with a pair of bayonet slots 12 which, when the drill is slipped over a transversely extending pin 13 on the drill spindle and then turned, will effectively lock the drill to the spindle.

The machine also includes a bed 14 on which are placed one or more abutments 15 to center the stone 16 on the bed 14. In this instance two abutments which are novelly formed are employed, but other means for holding the stone in place may be utilized. The abutments 15 are in the form of wooden blocks each of which is provided with a tapered front face. In the lower side of each block there is fitted a piece of relatively soft rubber 17.

Referring now to the drill 11, this consists of a hollow metal tube or pipe with a series of spirally arranged openings 18 therein so located that as the drill wears down there will be at least one opening at the lower end thereof to form the cutting edge to cut the hole in the disk 16. No novelty is claimed for this feature, as stated above.

However, we find that the drills used heretofore were not satisfactory because of the manner in which the cores were supposed to be broken. We overcome the disadvantages of the prior constructions by our novelly arranged core breaking improvements illustrated in Figs. 2 to 8.

Figure 3:
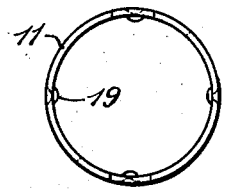
Fig. 3 is a top plan view thereof.
Figure 4:
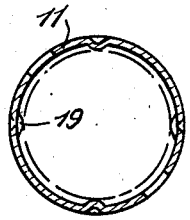
Fig. 4 is a sectional view taken along the line 4—4 of Fig. 2.
Figure 2:
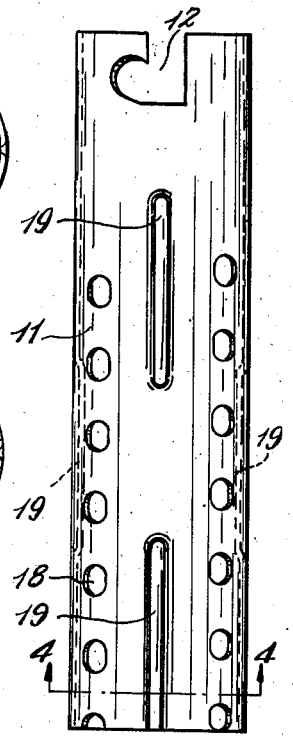
Fig. 2 is an enlarged view of the drill itself.

In Figs. 2, 3, and 4 we show one form of our invention wherein the core of the disk 16 is broken by providing one or more crimps or depressions 19 which extend lengthwise of the hollow drill and form protuberances on the inner wall thereof. In this instance, crimps 19 which extend only partway of the length of the drill are provided. Pairs of oppositely disposed crimps are formed in the drill, and the pairs of crimps are staggered, there being shown in Fig. 1 a construction wherein eight crimps are employed and in Fig. 4 a construction utilizing four crimps.

Figure 5:
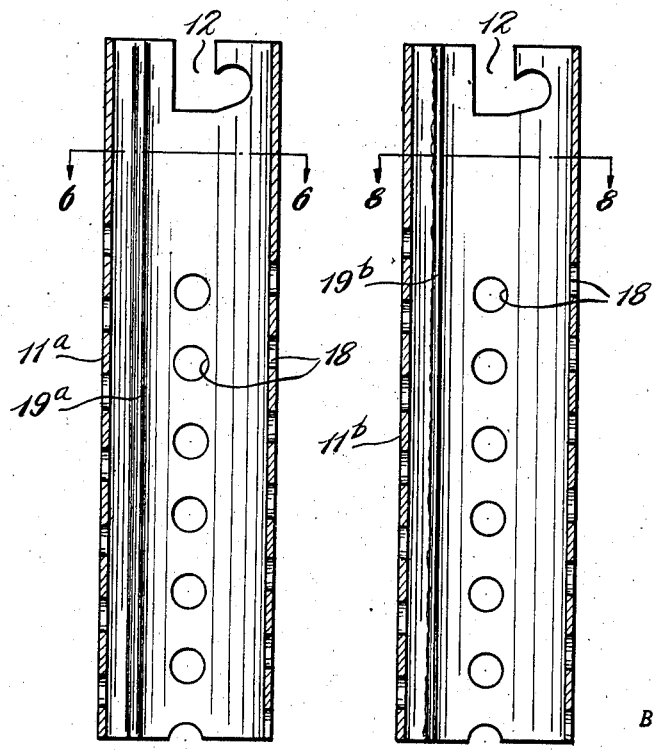
Fig. 5 is a longitudinal sectional view on an enlarged scale showing a modification.

The crimp may extend the full length of the cutting portion of the drill, as illustrated in Fig. 5, where the drill is designated 11a and the single crimp is designated 19a.

Figure 7:
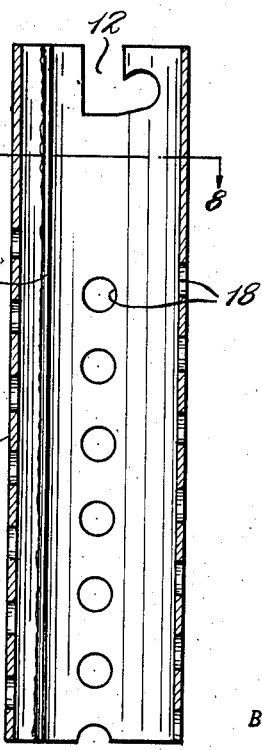
Fig. 7 is a longitudinal sectional view on an enlarged scale showing a further modification.
Figure 6:
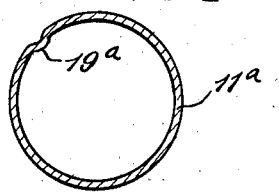
Fig. 6 is a sectional view taken along the line 6—6 of Fig. 5.
Figure 8:
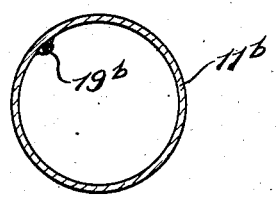
Fig. 8 is a sectional view taken along the line 8—8 of Fig. 7.

In Fig. 7 the rib 19b which extends the full length of the drill is formed by welding a metal rod or bar to the inner side of the drill. In the construction shown in Figs. 5 and 7 there may be provided more than one internal rib to break up the core, as, for example, a second rib 19a or 19b arranged opposite that shown, or, if more than two are employed, they may be arranged as desired. For example, they may be arranged 60° or 90° apart, or the ribs 19b may be arranged in the form of staggered rows which extend partway up the length of the tube, like the crimps 19 illustrated in Fig. 2.

In the use of a drill such as illustrated, the stone is centered with respect to the axis of the drill by pressing it against the rubber 17 of the two blocks 15, and then the drill is lowered and the hole is drilled, the core being broken very effectively by the internal crimps or by the internal rods, as the case may be. We might add that the hole which is drilled in the stone 16 is reamed as well. It will be understood of course that as the drill wears away another opening 18 will take the place of the one which previously did the cutting.

We have found that a device constructed in accordance with our invention is exceedingly efficient, the core of the stone being readily crushed or broken regardless of the type of stone being drilled. In Fig. 1 a sandstone grinding wheel is shown, but the stone may be formed of other material, such as limestone or granite, or, in fact, quarried stone generally, for the drilling of which our improved drill with its facilities for breaking up the core is well adapted. Additionally, as before stated, the drills of the several forms of the invention may be quickly and economically manufactured.

While we have shown the preferred constructions, we do not desire to be confined to the precise details shown but aim in our claims to cover all modifications which do not involve a departure from the spirit and the scope of the invention.

Having thus described our invention, we claim:

1. A drill for drilling holes in stone comprising a hollow tube or pipe having openings extending through the wall thereof, said openings being spaced longitudinally of the tube or pipe in staggered relation and forming cutting teeth at the lower end of the tube or pipe, said tube or pipe being provided on the interior thereof with one or more core crushing ribs which extend from the lower cutting edge upwardly throughout the range of the openings, said rib or ribs projecting inwardly beyond the effective range of the cutting edge and being devoid of cutting teeth.

2. A drill for drilling holes in stone comprising a hollow tube or pipe having openings extending through the wall thereof, said openings being spaced longitudinally of the tube or pipe in staggered relation and forming cutting teeth at the lower end of the tube or pipe, said tube or pipe being provided on the interior thereof with one or more longitudinally extending core crushing ribs in the form of inward crimps which extend from the lower cutting edge upwardlly throughout the range of the openings, said rib or ribs projecting inwardly beyond the effective range of the cutting edge and being devoid of cutting teeth.

HOWARD C. BARBOUR.
FRANKLIN S. MILLER.